May 9, 1933.  G. B. READ  1,907,443
FEEDER
Filed March 5, 1931  2 Sheets-Sheet 1
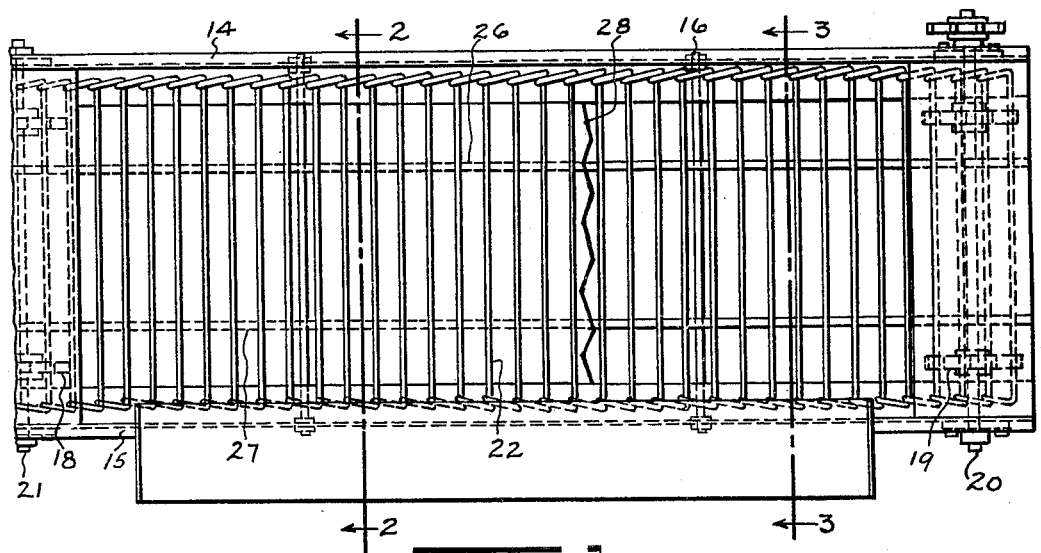
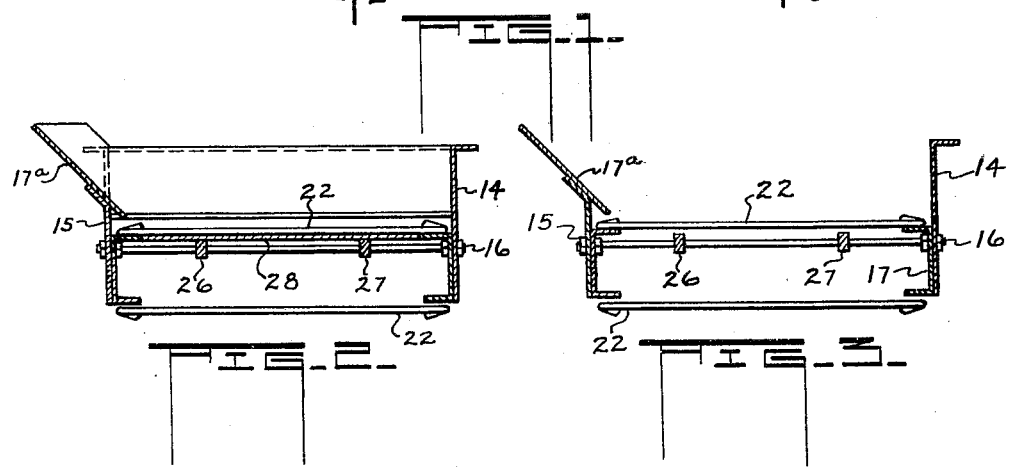
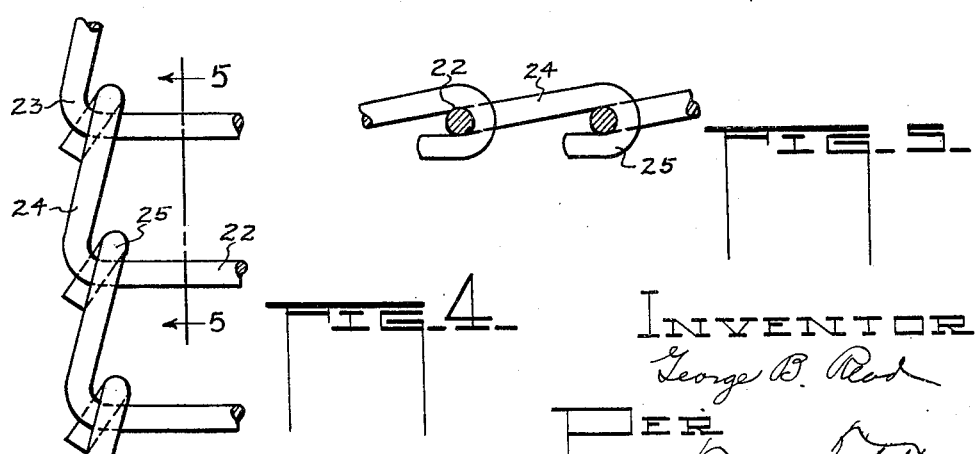
INVENTOR
George B. Read
PER
Jeffs & Jeffs
ATTYS.

May 9, 1933.  G. B. READ  1,907,443
FEEDER
Filed March 5, 1931  2 Sheets-Sheet 2
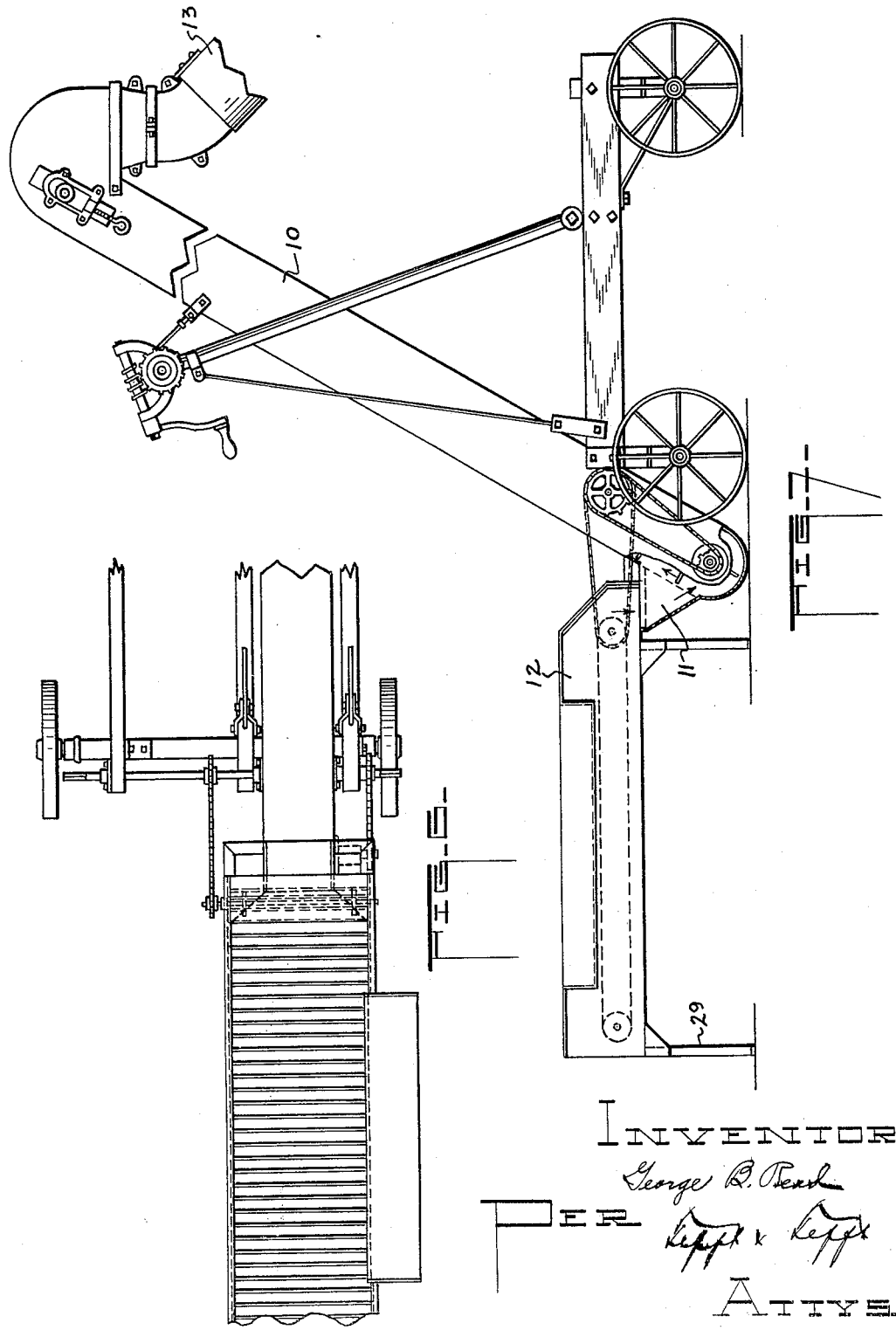

Patented May 9, 1933

1,907,443

UNITED STATES PATENT OFFICE

GEORGE B. READ, OF BLOOMINGTON, ILLINOIS

FEEDER

Application filed March 5, 1931. Serial No. 520,258.

This invention relates to feeder or drag mechanism adapted to be used in connection with grain elevating mechanism.

One of the objects of the invention lies in the provision of a specially formed feeder adapted to be associated with a conventional grain elevator, said feeder being provided with an open endless conveyor mechanism which permits progressive conveyance of ear corn and at the same time operating to cleanse same of any extraneous matter.

Another object lies in the provision of a feeder or drag mechanism capable of use in combination with a conventional grain elevator structure, said feeder comprising an open hopper member having an endless conveyor therein formed of a plurality of laterally disposed spaced rod members connected together by a peculiar formation of their end portions, which permits detachable and pivotal connection with adjacent rods, said conveyor operating not only as a progressive conveying medium for the corn but also to permit the extraneous matter to fall vertically through the feeder.

Still another object lies in the provision of a grain feeding mechanism adapted for use in connection with grain elevating mechanism, said feeder comprising an open hopper member, supporting and driving means for an endless conveyor composed of a plurality of spaced rod members secured together in a detachable and pivotal manner, there being also provided a supporting means for a detachable bottom permitting the elevator to be used not only as a conveyor for ear corn but also for small grain.

Other objects will appear in the following specification, taken in connection with annexed drawings, in which Fig. 1 is a plan view of my drag or feeder;

Fig. 2 is a cross-sectional view taken on the line 2—2 of Fig. 1, the same showing the detachable false bottom disposed in an operative position in the feeder to take care of the handling of small grain;

Fig. 3 is a cross-sectional view taken on the line 3—3 of Fig. 1, showing the feeder in a position adapted to handle ear corn;

Fig. 4 is an enlarged detail showing of the manner of hinging the interlocking portions of the endless conveyor;

Fig. 5 is a cross-sectional view taken on the line 5—5 of Fig. 4;

Fig. 6 is a plan view of applicant's feeder; and

Fig. 7 is an elevational showing of the feeder in operative connection with an elevator.

Before referring specifically to the drawings for a detailed description of applicant's drag or feeder, it might be stated that as far as the trade—and this includes the prior art of grain elevator mechanism—is concerned, the same has for a considerable number of years, remained in a practically inactive status and the production of such mechanism by a small group of manufacturers has resulted in an offering to the farmer of substantially a standard structure. In other words, the elevating structure, whether of the portable or stationary type, has comprised a drag or feeder adapted to receive either ear corn or small grain from a wagon, this feeder comprising intermittently disposed chain drawn flights operating to receive and convey either corn or small grain and to deliver same into the hopper of an elevator mechanism or similarly operated power drive flight mechanism, which in turn elevates the grain to the overhead receptacle in which same is adapted to be stored, obviously the corn being discharged into ventilated cribs and the small grain into conventional bins. As a matter of fact, until the development of the present character of drag or feeder mechanism, there has been no radical change or development as far as this portion is concerned. It is possibly true that in the manufacture of such elevator mechanisms there may have been a degree of advance insofar as mechanically perfecting said structures is concerned, but as far as the provision of a new and advantageous feeder mechanism is concerned, it is again stated that any advance in this direction has been unfortunately lacking.

Applicant, as will later be described, now provides a feeder or drag means adapted to be used in connection with a conventional grain elevator, which due to its structural make-up, has the obvious advantage, when in use as an ear corn handling medium, of cleaning the ear corn prior to the deposit of same in the hopper of the elevator, from whence it is immediately elevated to its proper receptacle. This cleaning of the corn is accomplished, due to the particular fashioning of the endless conveyor mechanism, which permits dirt, small grain, corn silks, shocks and other extraneous matter, to drop directly through the endless conveyor in such manner that the corn ears alone are deposited in the boot of the elevator. With other drag or feeder mechanisms, either known to the trade or disclosed in the prior art patents, not only the ear corn but all of the matter heretofore referred to was carried along by the endless conveyor in the feeder and deposited as a whole in the boot of the elevator. The elevator, operating under normal conditions, not only elevated and discharged ear corn but also the undesirable and extraneous matter into the ventilated crib. Such handling of the ear corn resulted in many instances not only in a gradual deposit of extraneous matter in the boot of the elevator, which eventually caused damage to the operating portions and necessitated repair, but also a more important disadvantage in that the extraneous matter deposited with the ear corn in the crib tended to prevent proper circulation of air through the corn in the crib and further actually tended to close the ventilating openings in the crib, due to the fact that same, because of its make-up, was more susceptible of being jammed or clogged in said openings.

Applicant now provides, as will hereinafter be described, a drag or feeder which not only obviates the disadvantages accompanying the old type of feeder, but also it is sufficiently flexible in its structural make-up, due to the possibility of associating a detachable bottom therewith, for also handling small grain in a highly efficient manner.

In the drawings, in Fig. 1 appears a general showing of a conventional elevator mechanism having applicant's novel feed or drag associated in operative connection therewith. Inasmuch as the elevator itself is somewhat conventional in design, it is thought necessary only to describe same in a general way, referring to the elevator sections as 10, the boot as 11, which is adapted to receive the ear corn or grain from the feeder, and finally the endless chain driven flight mechanism 12, which is of ordinary design and obviously adapted to raise the ear corn or small grain to an elevated position, where same is discharged through spout 13 into a corn crib or grain bin, as the case may be.

Specifically referring to the feed or drag member, which is disposed in a position adjacent the bottom of the elevator and in a position to discharge directly into the boot thereof, same is driven simultaneously by the same power mechanism which transmits power to the elevator. However, this feature is not essential to applicant's device and it is apparent that the feeder might just as well be driven from an independent source. The feeder itself comprises a hopper portion, which comprises the upright side members 14 and 15 which are joined at their ends to form a substantially box like or perhaps, more specifically, a grain-receiving receptacle. It is apparent that the form and size of the hopper is immaterial to the present invention.

Secured either by means of rivets, bolts, or as a matter of fact, by welding, in the plural manner shown at 16, and projecting laterally and inwardly from the sides 14 and 15 of the hopper in a parallel manner, are the endless carrier supporting ledges 17. These ledges may be secured to the hopper by use of angular steel portions 17a, as shown in the drawings or by the disposition of independent angular sections, as may be desired.

At either end of the hopper are the conventional sprocket mechanisms 18 and 19 which are adapted to permit rotation of the endless carrier about the ends of the hopper. These conventional sprockets are disposed upon shafts 20 and 21, which in turn find supporting means in the hopper itself. Obviously, one of these shafts is extended in a manner to receive a driving sprocket adapted to be connected either with the driving mechanism for the elevator or from an independent power transmitting means as the case may be.

With respect to the hopper itself, although same comprises side and end portions previously described, nevertheless it is apparent, as far as this structure is concerned, that same is left open at the bottom for a definite purpose. The endless carrier in the present instance is not formed of a plurality of flights connected at either side to the well known link chain mechanism, but as a matter of fact it takes a definite and distinct form. The carrier has no uprightly disposed flight mechanism thereon. It is formed, as is clearly shown in the drawings, by a plurality of metal rods 22 cut to a definite length. The ends of the rods at either side are bent sharply as at 23 with said ends projected in the same direction at either side for a determined distance. These ends 24 are also tapered slightly inwardly, as is apparent, to permit engagement with similarly bent portions 23 in the adjacent rod. The ends 24 finally have their extreme end portions hooked sharply as at 25 in a manner to engage in a detachable manner the curved portions 23 of adjacent flights. It is apparent that these rods are all formed in exactly the same manner, that they are capable of a detachable relationship one with the other, and further, and finally that they are so formed and arranged to permit ready assembly one with the other to form an endless conveying mechanism.

The connection of the hook portion 25 with adjacent similarly formed rods is such as to permit rotation of said hooks with said rods to allow pivotal or rotational movement of the conveyor about the sprockets at either end of the feeder.

As far as the spacing of the rods 22 is concerned, the same is unimportant except that the rods must be placed sufficiently close to each other to prevent the ear corn from dropping through the carrier. As a matter of fact, the spacing is such as to satisfactorily support the ear corn and to readily permit passage therethrough of the extraneous matter previously mentioned.

Applicant's above described feeder or drag adapted for use in connection with elevating mechanism has the additional feature of being readily converted into a feeder which is capable of handling small grain in a highly satisfactory manner. Obviously, the feeder, in its above described condition, would prevent proper handling of small grains inasmuch as such grains would fall directly through the conveyor. However, in order that applicant's feeder structure may be sufficiently flexible to handle small grain, there has been provided longitudinal and lateral supports 26 and 27 respectively which have their ends secured, as herein shown, to the supporting angles for the endless carrier. Obviously, such members, which form the false bottom for the feeder, might just as well be attached to the framing of the feeder itself, there being, however, sufficient clearance between same and the carrier to permit placement thereon by insertion from either end of the feeder of a metal bottom 28. This detachable bottom 28 comprises merely an elongated rectangularly shaped metal sheet, which is inserted between the spaced conveyor rods at one end of the feeder, the same finally assuming a position immediately beneath the endless carrier, finding support upon the longitudinally and horizontally disposed portions 26 and 27. As a matter of fact, as shown in the drawings, this bottom is formed, as far as size is concerned, in such manner that its lateral edges lie immediately adjacent the inwardly projecting edges of the angular supports 17a for the outer edges of the endless carrier.

It will be noted that the feeder is elevated from the ground by means of the plural leg portions 29. In the drawings, the feeder has been shown in operative engagement with the elevator, although not actually connected thereto for the purpose of pivotal movement about the boot of the elevator. Such connection of a feeder of applicant's type might well be made in this pivotal and conventional manner to an elevator mechanism if same were desired, without changing in the least the structural and novel features upon which this application is based.

With respect to the operation of my specially formed feeder or drag mechanism for use in connection with elevating mechanisms of one kind or another, although the drawings show the feeder in operative engagement and connection with a portable elevator, nevertheless it is immediately apparent that same might just as well be used in connection with any character of grain elevating mechanism, whether of the portable, stationary or upright type, this including, of course not only outside elevators, but also inside elevators permanently connected to and forming a part of a grain crib.

The feeder is disposed in an operative position adjacent the boot of the conventional elevating mechanism. The corn is dumped directly into the hopper of the feeder, whereupon the endless carrier, composed of a multiplicity of laterally disposed rods connected together in the novel manner before described, conveys the corn directly to the boot of the elevator, where it is picked up by the elevating mechanism and finally discharged from the spout directly into the ventilated corn crib. The endless conveyor is so fashioned as not only to support the corn for the purpose of the conveying operation, but also to clean the corn during its progressive movement by permitting extraneous and other undesirable matter of any kind to drop directly through the conveyor. The inactive but moving under side of the conveyor in no way deters final discharge of the extraneous matter because of the size of the openings between the lateral rods.

In view of the fact that the feeder is open at the bottom, it is apparent that the undesirable matter is dropped directly onto the ground underlying the feeder, which is elevated by means of the plural leg portions.

When it is desired that the feeder or drag be used for handling small grain, the operator merely inserts the detachable bottom through the open space in the conveyor at the end thereof, forcing same to a final position immediately underlying the endless conveyor, the bottom resting upon the longitudinally and horizontally disposed supporting portions. The bottom is so formed as to have its edges fit closely against the angular conveyor supports, thus preventing the small grain from dropping through the feeder. When such detachable bottom has been placed in operative position in the feeder, the same is then in condition to handle the small grain in a highly satisfactory manner.

As far as the operation is concerned, it is thought apparent, in that the small grain is dumped into the hopper and the rapidly moving laterally disposed rods gradually convey the grain to the boot of the elevator in substantially the same manner as the ear corn was handled.

As far as the actual conveying of either the corn or small grain is concerned, there is with this type of feeder less probability of clogging the hopper than with the conventional intermittently disposed flight conveyors, in that in this instance there is a greater number of conveyor portions, namely, the closely connected rod members which operate to move either the ear corn or grain in a more gradual, although progressive, movement towards the hopper.

As far as the handling of small grain is concerned, there is not the necessity of removing extraneous matter therefrom which is so desirable in the handling of ear corn, in that the grain itself is delivered to the hopper in a much cleaner condition.

What I claim is:

A device of the class described including in combination a grain elevator, a feeder in connection therewith adapted to receive grain and convey same to the elevator, said feeder including an open hopper, conveyor supporting and driving means, an endless conveyor formed of a plurality of laterally disposed rods bent sharply at their ends in a manner to form hook portions capable of detachable and pivotal engagement with adjacent rods, bottom supporting members secured to the feeder and a bottom capable of detachable positioning upon said bottom supporting members to permit handling of small grain.

In testimony whereof I have hereunto affixed my signature.

GEORGE B. READ.